United States Patent [19]

Pedersen

[11] 4,077,508

[45] Mar. 7, 1978

[54] SEALED HANGER BEARING FOR USE WITH ABRASIVE CONVEYORS

[75] Inventor: John A. Pedersen, Burlington, Canada

[73] Assignee: Wheelabrator-Frye Inc., Hampton, N.H.

[21] Appl. No.: 732,931

[22] Filed: Oct. 15, 1976

[51] Int. Cl.$^2$ .............................................. B65G 33/00
[52] U.S. Cl. ................................... 198/666; 198/672; 277/80; 308/27; 308/36.1; 308/187.1
[58] Field of Search .................. 198/666, 672; 277/80; 308/27, 36.1, 35, 187, 187.1, 187.2, DIG. 8, DIG. 9

[56] References Cited

U.S. PATENT DOCUMENTS

| | | | |
|---|---|---|---|
| 2,602,679 | 7/1952 | Malmsten | 308/187.1 |
| 2,974,981 | 3/1961 | Vervest et al. | 277/80 |
| 3,212,834 | 10/1965 | Mayer et al. | 308/DIG. 8 |
| 3,289,819 | 12/1966 | Steinmetz | 198/666 |
| 3,576,326 | 4/1971 | Hafner et al. | 308/36.1 |
| 3,865,444 | 2/1975 | Lavoie | 308/187.1 |
| 3,929,389 | 12/1975 | Riegler et al. | 308/DIG. 8 |

Primary Examiner—John J. Love
Assistant Examiner—Joseph E. Valenza
Attorney, Agent, or Firm—McDougall, Hersh & Scott

[57] ABSTRACT

An enclosed hanger bearing suitable for use under severe operating conditions is disclosed. The bearing is completely sealed to prevent the entry of abrasive materials. The bearing has an adaptor plate for engaging augers which are supported by the bearing from an overhead support. A combination of felt and magnetic strip seals are employed to prevent entry of abrasive into the bearing which is permanently lubricated.

6 Claims, 2 Drawing Figures

SEALED HANGER BEARING FOR USE WITH ABRASIVE CONVEYORS

BACKGROUND OF THE INVENTION

This invention relates to the field of hanger or support bearings. More specifically, it relates to the field of bearings for use in extremely abrasive environments as, for example, bearings utilized in systems for conveying particulate, such as steel shot, grit, sand, and the like. Many industrial situations require the use of abrasive-type particulate as, for example, the surface treatment of precision cast parts by shot blasting. Such systems require the use of abrasive recovery devices. Typically, such systems include screw feeds or conveyors which receive the abrasive and convey it to an elevator for return to the blasting wheel or similar device. Such auger or screw conveyors may often carry the abrasive a considerable distance and, accordingly, more than one section is frequently needed. Under these circumstances it is necessary to support the auger sections by means of a hanger bearing which transmits the shaft rotation from one section to the next and which also supports the section.

Because of the very severe conditions to which these bearings are subjected, commercially available hanger bearings are very short lived. Attempts to seal the bearings against the entry of abrasive have heretofore been unsuccessful and, accordingly, frequent replacement is the result.

It is accordingly an object of the present invention to provide a totally enclosed hanger bearing particularly designed for abrasive environments.

It is another object of the present invention to provide a permanently lubricated hanger bearing for use in abrasive environments.

Another object of the invention is to provide a hanger bearing capable of transmitting power from one section of an auger to the next while preventing entry of abrasive into the sealed bearing structure.

Other objects and advantages of the invention will be apparent from the remaining portion of the specification.

DETAILED DESCRIPTION

Figure 2:
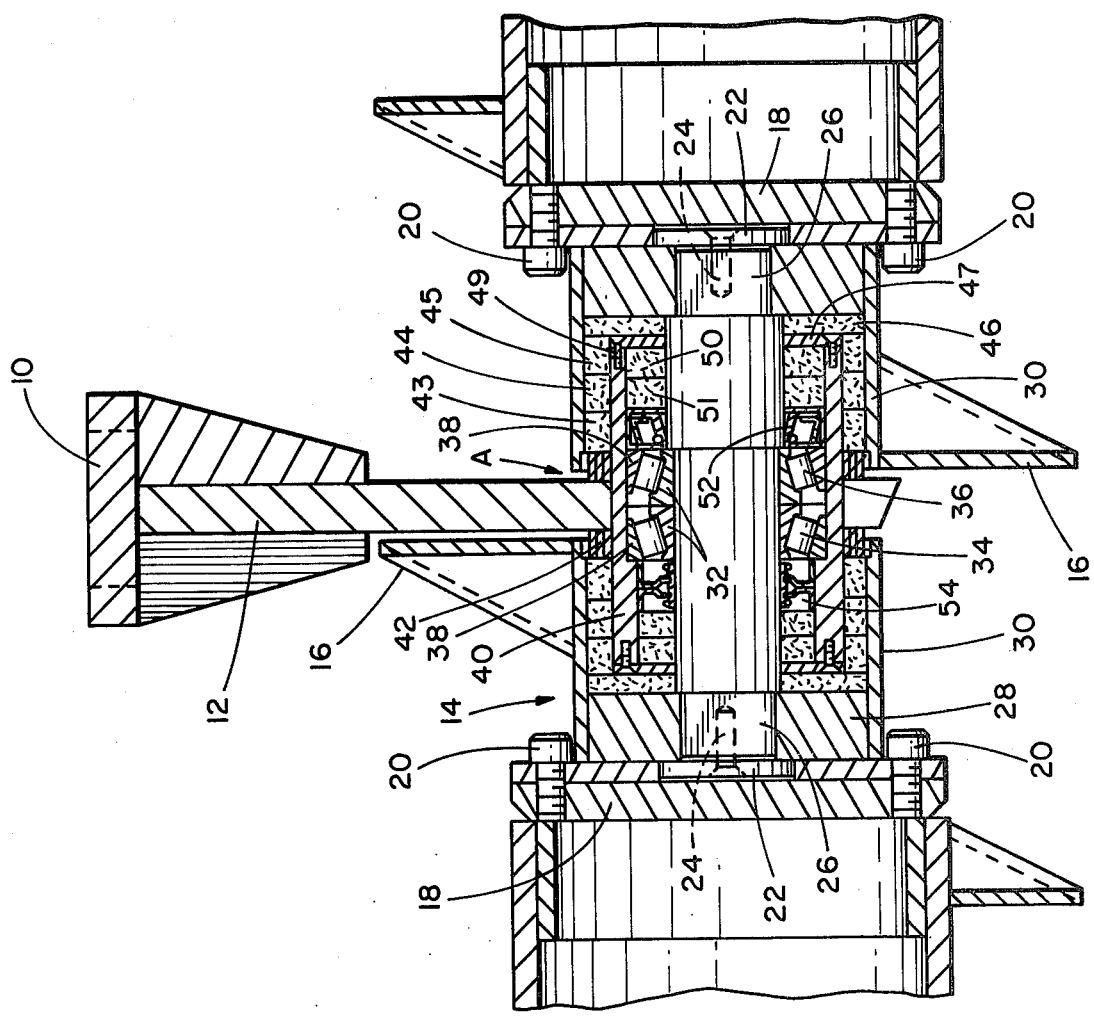
FIG. 2 is a view along the lines 2—2 of FIG. 1.
Figure 1:
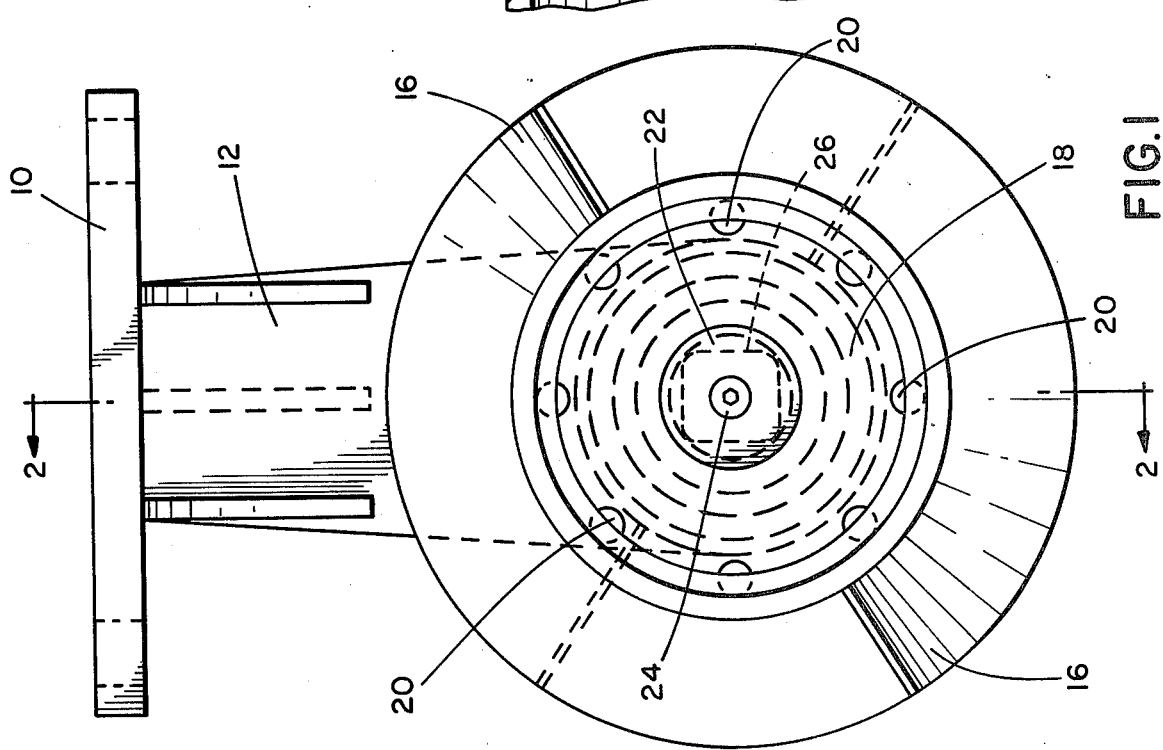
FIG. 1 is a sectional view through the hanger bearing according to the invention illustrating the details thereof.

Referring to the drawings, the hanger bearing according to the invention is illustrated. The hanger bearing is secured to an overhead support structure 10 on a vertically positioned member 12. The bearing, indicated generally at 14, is for use with a screw conveyor or auger-type device. The auger blades are indicated generally at 16. As is well known in the art, such auger blades are capable of feeding material, such as abrasives, by rotation of the blades thereby urging the material in a direction determined by the pitch of the blades. Attached to each end of the hanger bearing is an adapter plate 18 for connection to an auger section. The adapter plate is secured to the bearing by cap screws 20. Beneath the adapter plate is a sealing washer 22 which is secured by a screw 24 to a bearing shaft 26. As best seen in FIG. 2, the ends of shaft 26 are rectangular in cross section. Bearing segment 28 is similarly rectangular in cross section so that the shaft 26 engages section 28 for rotation therewith. Secured to the section 28 is a cylindrical surface 30 to which the auger blades 16 may be affixed.

Carried by the shaft 26 is an inner race 32 for a pair of tapered bearings 34 and 36. The outer races 38 for these bearings are secured to a cylinder 40 which is, in turn, secured to the vertical member 12.

As will be apparent from the description given thus far, when the auger is driven the adapter plate 18 is rotated from the previous auger section to, in turn, rotate the shaft 26. Shaft 26 rotates carrying with it the surfaces 28 and 30. The surface 40 and the races 38 are stationary being secured to the vertical member 12.

The balance of the structure of the bearing is devoted to maintaining the bearing in a totally sealed or abrasive impervious condition. To prevent abrasive from entering in the area between the vertical member 12 and the surface 30, which area is designated A, magnetic seal strips 42 are provided. These attract metallic abrasive and prevent it from entering the bearing. Adjacent the seal strips 42 are a series of felt seals 43, 44, 45, and 46. These seals are preferably glued together at time of assembly and secured to surface 40. Adjacent the lower end of the felt seal 46 is a bronze bearing 47 secured to surface 40 by a screw 49. These bearings stabilize the shaft rotation. Disposed inwardly of the bearing 47 are two additional felt seals 50 and 51. Disposed on either side of the bearing races and in communication therewith are oil seals 52 and 54.

As will be apparent from the foregoing description, the invention resides in the provision of a totally enclosed hanger bearing which can be used under severe conditions. By totally enclosing the bearing, abrasive is prevented from entering and destroying the bearings. In spite of the fact that the bearing is totally enclosed, easy removal for service or replacement is obtained due to the use of the adapter plate and cap screw arrangement. The bearing is lubricated for life and thus does not require periodic service. Preferably, the bearings provided will be high impact-type roller needle bearings although other types are suitable for the purpose.

While I have shown and described embodiments of this invention in some detail, it will be understood that this description and illustrations are offered merely by way of example, and that the invention is to be limited in scope only by the appended claims.

I claim:

1. An enclosed hanger bearing construction for connecting two rotary conveyors comprising:
   (a) an overhead bearing support,
   (b) roller bearings and means for securing said bearings to said support,
   (c) a shaft rotatable on said bearings,
   (d) means for sealing said bearings against the entry of abrasive including:
      i. a pair of hollow cylinders each disposed over approximately half of said securing means, one cylinder on either side of said support,
      ii. a plurality of felt seals packed in the space between said securing means and said cylinders,
      iii. magnetic seals disposed at the point where the inner ends of said cylinders terminate to permit connection between said support and said securing means for preventing the entry of magnetic abrasive thereinto.
   (e) means for connecting said shaft to said rotary conveyors including an adapter plate and bearing segment located over the outer end of each of said cylinders, said segments connected to said plates and having means for receiving and securing said shaft therein, each of said plates having means for attachment to one of said rotary conveyors.

2. The device according to claim 1 wherein said bearing support includes a vertically positioned member.

3. The device according to claim 1 wherein said roller bearings are permanently lubricated roller bearings.

4. The device according to claim 1 wherein said means for securing said roller bearings include a horizontally disposed cylinder having outer races for the bearings secured thereto.

5. The device according to claim 1 further including bronze bearings for stabilizing said rotating shaft.

6. The device according to claim 1 wherein the ends of said shaft are rectangular in cross section and said means for receiving and securing is a rectangular opening.

* * * * *